(12) United States Patent
Lei et al.

(10) Patent No.: US 12,284,134 B2
(45) Date of Patent: *Apr. 22, 2025

(54) METHOD AND APPARATUS FOR FALLBACK OPERATION FOR SEMI-STATIC HARQ-ACK CODEBOOK DETERMINATION

(71) Applicant: LENOVO (BEIJING) LIMITED, Beijing (CN)

(72) Inventors: Haipeng Lei, Beijing (CN); Haiming Wang, Beijing (CN); Zhi Yan, Beijing (CN); Xiaodong Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,646

(22) Filed: Oct. 13, 2023

(65) Prior Publication Data

US 2024/0178974 A1 May 30, 2024

Related U.S. Application Data

(63) Continuation of application No. 16/969,688, filed as application No. PCT/CN2018/076716 on Feb. 13, 2018, now Pat. No. 11,824,811.

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1607* (2013.01); *H04L 1/1864* (2013.01); *H04W 28/06* (2013.01)

(58) Field of Classification Search
CPC ... H04L 5/0055; H04L 1/1812; H04L 1/1819; H04L 1/1671; H04L 1/1896;
(Continued)

(56) References Cited

U.S. PATENT DOCUMENTS 9,408,158 B2   8/2016  Yin et al.
11,824,811 B2 * 11/2023  Lei .................. H04L 5/0055
(Continued)

FOREIGN PATENT DOCUMENTS

WO    2017045499 A1    3/2017
WO    2017193390 A1    11/2017

OTHER PUBLICATIONS

U.S. Appl. No. 16/969,688, "Office Action Summary", USPTO, Jan. 7, 2022, pp. 1-18.
(Continued)

*Primary Examiner* — Omer S Mian
(74) *Attorney, Agent, or Firm* — Kunzler Bean & Adamson (57) ABSTRACT

The present application relates to method and apparatus for fallback operation for semi-static HARQ-ACK codebook determination. One embodiment of the present disclosure provides an apparatus comprising: a receiver that receives at least one down-link (DL) transmission within a DL association set; a processor that determines whether to use a fallback hybrid automatic repeat request acknowledgement (HARQ-ACK) transmission; and a transmitter that transmits a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used.

20 Claims, 6 Drawing Sheets

(51) Int. Cl.
*H04L 1/1829* (2023.01)
*H04W 28/06* (2009.01)

(58) Field of Classification Search
CPC ... H04L 1/1854; H04L 1/1861; H04L 5/0053; H04W 2/042; H04W 72/1289; H04W 24/10; H04W 48/12; H04M 2/0453
See application file for complete search history.

(56) References Cited

U.S. PATENT DOCUMENTS

| | | |
|---|---|---|
| 2012/0155337 A1 | 6/2012 | Park |
| 2013/0242816 A1 | 9/2013 | He et al. |
| 2013/0286948 A1 | 10/2013 | Gao et al. |
| 2014/0092832 A1 | 4/2014 | Han et al. |
| 2014/0286320 A1 | 9/2014 | He |
| 2015/0264678 A1 | 9/2015 | Yin et al. |
| 2016/0277155 A1 | 9/2016 | Nissilä |
| 2018/0006791 A1 | 1/2018 | Marinier et al. |
| 2020/0059327 A1* | 2/2020 | Kini ............... H04L 5/0055 |
| 2020/0295878 A1 | 9/2020 | Choi et al. |
| 2020/0374040 A1* | 11/2020 | Lou ............... H04L 5/0055 |
| 2020/0374045 A1 | 11/2020 | Yin et al. |
| 2021/0250130 A1 | 8/2021 | Lei |
| 2021/0314094 A1 | 10/2021 | Gao |

OTHER PUBLICATIONS

Wilus Inc., "Discussion on UL HARQ-ACK feedback for CBG-based retransmission", 3GPP TSG RAN WG1 NR Ad-Hoc#2 R1-1711361, Jun. 27-30, 2017, pp. 1-4.

* cited by examiner

METHOD AND APPARATUS FOR FALLBACK OPERATION FOR SEMI-STATIC HARQ-ACK CODEBOOK DETERMINATION

This application is a continuation of U.S. patent application Ser. No. 16/969,688, filed Aug. 17, 2020 (titled 'METHOD AND APPARATUS FOR FALLBACK OPERATION FOR SEMI-STATIC HARQ-ACK CODEBHOOK DETERMINATION'), which claims priority to International Application No. PCT/CN2018/076716, filed Feb. 13, 2018 (also titled 'METHOD AND APPARATUS FOR FALLBACK OPERATION FOR SEMI-STATIC HARQ-ACK CODEBHOOK DETERMINATION'), all of which are incorporated herein by reference in their entirety.

TECHNICAL FIELD

The present application generally relates to 3GPP 5G new radio (NR), especially for HARQ-ACK transmission for NR downlink data transmission.

BACKGROUND OF THE INVENTION

In wireless communication technology, HARQ-ACK feedback technology is commonly used during data transmission, so as to feedback whether data was correctly received in a downlink (DL) or uplink (UL) transmission. HARQ-ACK represents collectively the Positive Acknowledgement (ACK) and the Negative Acknowledgement (NACK). ACK means a data unit is correctly received while NACK means a data unit is erroneously received or missing. The HARQ-ACK feedback bits corresponding to Physical Downlink Shared Channel (PDSCH) are transmitted either on the Physical Uplink Control Channel (PUCCH) or on the Physical Uplink Shared Channel (PUSCH). HARQ-ACK feedback for multiple PDSCHs can be multiplexed in one HARQ-ACK codebook by means of HARQ-ACK multiplexing.

There are two methods for HARQ-ACK codebook determination, semi-static and dynamic. For semi-static HARQ-ACK codebook, the benefit is the codebook size determination is quite simple. However, the drawback is too much overhead is caused. Thus, a manner of reducing the overhead in the HARQ-ACK codebook is desirable.

BRIEF SUMMARY OF THE INVENTION

One embodiment of the present disclosure provides an apparatus comprising: a receiver that receives at least one downlink (DL) transmission within a DL association set; a processor that determines whether to use a fallback hybrid automatic repeat request acknowledgement (HARQ-ACK) transmission; and a transmitter that transmits a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used.

Another embodiment of the present disclosure provides an apparatus comprising: a transmitter that transmits at least one downlink (DL) transmission within a DL association set; a processor that determines whether a fallback hybrid automatic repeat request acknowledgement (HARQ-ACK) transmission is to be used; and a receiver that receives a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used.

Yet another embodiment of the present disclosure provides a method comprising: receiving at least one downlink (DL) transmission within a DL association set; determining whether to use a fallback hybrid automatic repeat request acknowledgement (HARQ-ACK) transmission; and transmitting a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used.

Yet another embodiment of the present disclosure provides a method comprising: transmitting at least one downlink (DL) transmissions within a DL association set; determining whether a fallback hybrid automatic repeat request acknowledgement (HARQ-ACK) transmission is to be used; and receiving a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for semi-statically configured HARQ-ACK feedback information. To facilitate understanding, embodiments are provided under specific network architecture and new service scenarios, such as 3GPP 5G, 3GPP LTE Release 8 and onwards. Persons skilled in the art know well that, with developments of network architecture and new service scenarios, the embodiments in the subject disclosure are also applicable to similar technical problems.

Figure 1:
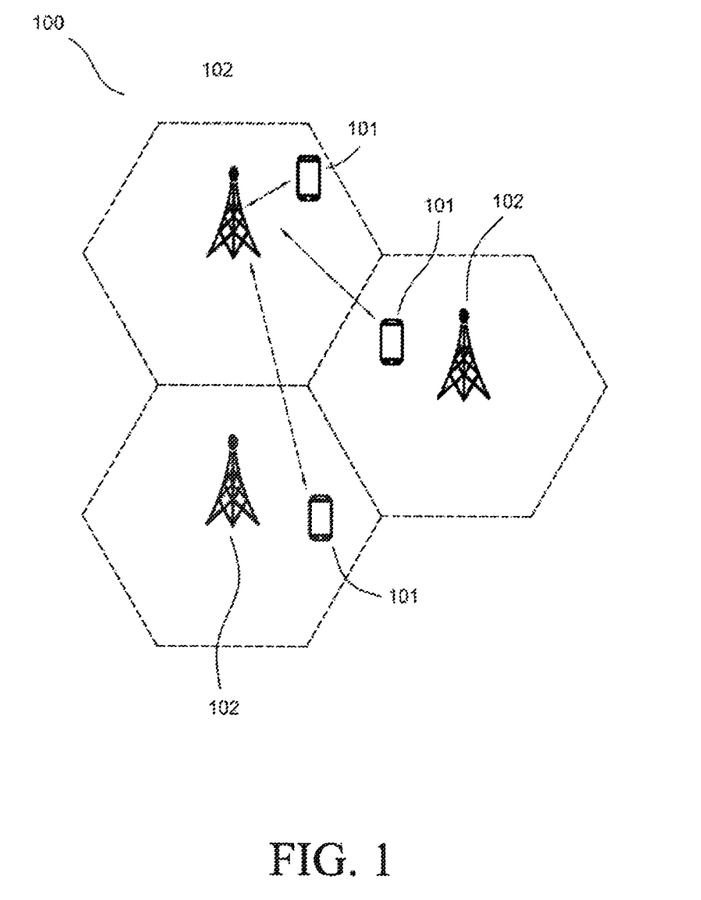
FIG. 1 illustrates an example block diagram of a wireless communication system according to an embodiment of the present disclosure.

FIG. 1 depicts a wireless communication system 100 according to an embodiment of the present disclosure.

As shown in FIG. I, the wireless communication system 100 includes remote units 101 and base units 102. Even though a specific number of remote units 101 and base units 102 are depicted in FIG. 1, one of skill in the art will recognize that any number of remote units 101 and base units 102 may be included in the wireless communication system 100.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, remote units 101, user terminals, a device, or by other terminology used in the art. The remote units 101 may communicate directly with a base unit 102 via uplink (UL) communication signals.

The base units 102 may be distributed over a geographic region. In certain embodiments, a base unit 102 may also be referred to as an access point, an access terminal, a base, a base station, a macro cell, a Node-B, an enhanced Node B (CNB), a base units 102, a Home Node-B, a relay node, a device, or by any other terminology used in the art. The base units 102 are generally part of a radio access network that may include one or more controllers communicably coupled to one or more corresponding base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in some embodiments the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

According to an embodiment of the present disclosure, downlink (DL) transport blocks (TBs) are carried on the Physical Downlink Shared Channel (PDSCH). A maximum of two TBs can be transmitted in one PDSCH in one serving cell and in one slot. In addition, a TB may include multiple code block groups (CBG), and the maximum number of CBGs included in a TB is configured by Radio Resource Control (RRC) signalling.

In NR (new radio), regarding HARQ-ACK multiplexing, HARQ-ACK codebook includes multiple HARQ-ACK bits for:

Multiple CBGs of one TB;
Multiple TBs/codewords of one PDSCH;
Multiple PDSCHs in time domain; and
Multiple PDSCHs on multiple configured component carriers.

For semi-static HARQ-ACK codebook determination, the codebook size is dependent on the size of downlink association set and the number of configured DL carriers. If remote units 101 are also configured in CBG-based retransmission on DL carriers, the codebook size determination should also consider the RRC configured number of CBGs per TB. For example, if remote units 101 is configured with C carriers in carrier domain, where C1 carriers are configured for TB-based retransmission and C2 carriers are configured for CBG-based retransmission, C=C1+C2, and if maximum M CBGs per TB are configured for CBG-based carriers, assuming the downlink association set size is N, then the semi-static HARQ-ACK codebook size is equal to (C1*N+C2*N*M) in case each PDSCH carries one TB. If each PDSCH on some carriers can carry two TBs, the semi-static HARQ-ACK codebook size shall be further enlarged.

For semi-static HARQ-ACK codebook, the benefit is that the codebook size determination is quite simple, and that there is no ambiguity between remote units 101 and base units 102 on determining HARQ-ACK codebook size even when some DL transmissions are missed.

However, the drawback is too much overhead is caused especially when some TBs have smaller number of CBGs than the configured CBG number or some slots in the bundle window are not scheduled. In that case, remote units 101 has to pad "NACK" bits to guarantee HARQ-ACK codebook size equal to the value of (C1*N+C2*N*M). Although redundant NACK bits are padded, the meaning of each HARQ-ACK bit is clear and fixed for base units 102 and remote units 101.

In the present disclosure, several alternatives are proposed for fallback HARQ-ACK transmission, so that remote units 101 configured with semi-static HARQ-ACK codebook determination can transmit HARQ-ACK feedback without the redundant NACK bits.

In a preferred embodiment of the present disclosure, a Fallback Indicator (FI) is included in each DL transmission. The base unit sets the FI as "1" if it requests the remote unit to use the fallback HARQ-ACK transmission; otherwise, the base unit sets the FI as "0." The base unit may set the FI based on any condition determined by the based unit or any condition specified in the standard.

Figure 2:
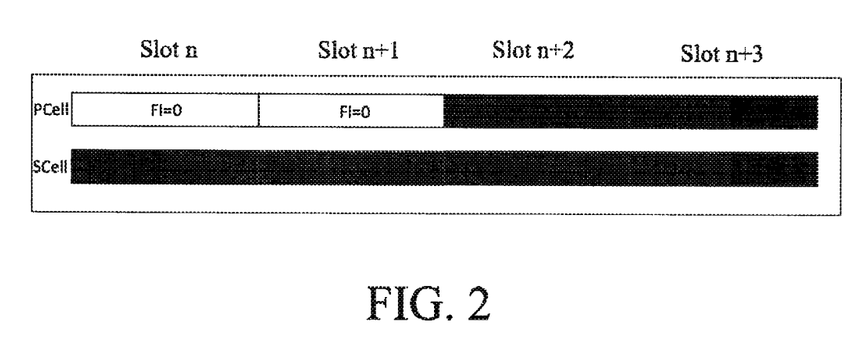
FIG. 2 illustrates a downlink association set according to an embodiment of the present disclosure, where a fallback operation is not to be used.

FIG. 2 shows a downlink association set according to the preferred embodiment, where a fallback HARQ-ACK transmission is not to be used. In the preferred embodiment, the fallback HARQ-ACK transmission is to be used if only a single DL transmission is transmitted. Without consideration of two-codeword transmission and CBG-based retransmission for simplicity, the semi-static HARQ-ACK codebook size for the downlink association set depicted in FIG. 2 is 8. A base unit 102 transmits two DL transmission in slot n and slot n+1 on the primary cell, and the base unit 102 indicates not to use the fallback HARQ-ACK transmission by setting Fallback indicator (FI) to "0". In this way, even remote unit 101 misses detection of PDSCH in slot n, remote unit 101 would transmit semi-static HARQ-ACK codebook with size of 8 instead of a fallback HARQ-ACK codebook. Consequently, misunderstanding between base units 102 and remote units 101 can be avoided.

Figure 3:
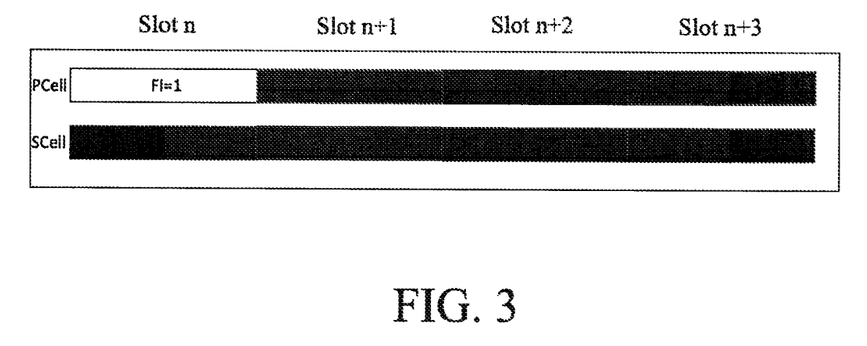
FIG. 3 illustrates a downlink association set according to an embodiment of the present disclosure, where a fallback operation is to be used.

FIG. 3 shows a downlink association set according to the preferred embodiment, where the fallback HARQ-ACK transmission is to be used. The base unit 102 requests the remote unit 101 to use the fallback HARQ-ACK transmission by setting the FI as "1" since a single DL transmission is transmitted in slot non primary cell. Then, the base unit 102 is aware that the fallback HARQ-ACK transmission is to be used and thus detects HARQ-ACK codebook on a fallback resource. At the remote unit 101 side, upon detection of a DL transmission with FI set to "1," the remote unit 101 uses the fallback resource to transmit the fallback HARQ-ACK codebook for the DL association set. Even remote units 101 misses the single DL transmission in slot n, there is no any feedback transmitted on fallback resource. This case can be identified by base unit 102 by DTX detection on the fallback resource.

In this way, the misunderstanding between the base unit 102 and remote unit 101 on the fallback operation can be solved. Remote units 101 and base units 102 can work properly. Other alternatives for aligning the base unit and the remote unit on whether to use the fallback HARQ-ACK transmission will be described later.

Figure 4:
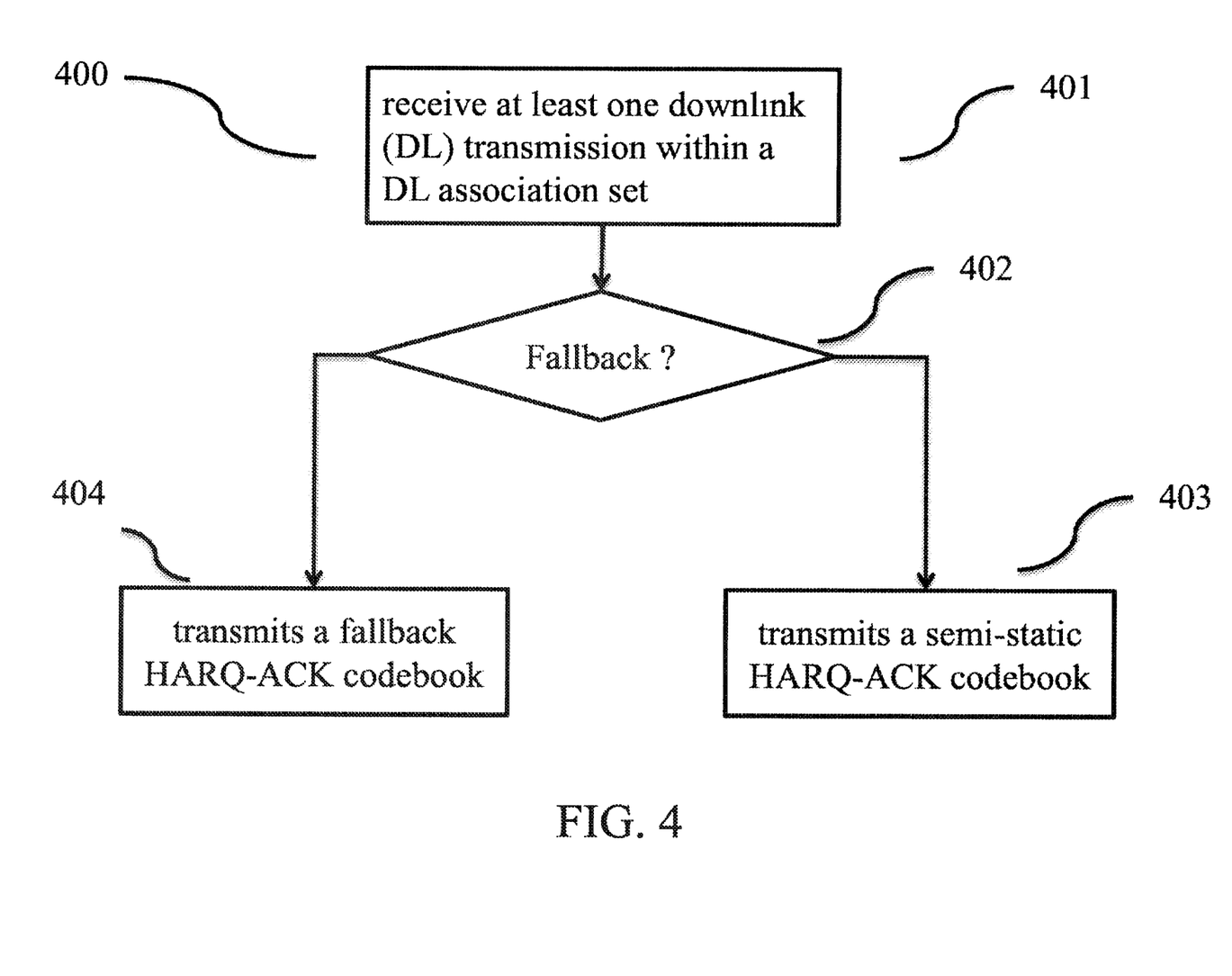
FIG. 4 illustrates a flowchart of a method according to an embodiment of the present disclosure.

FIG. 4 illustrates a method 400 according to an embodiment of the present disclosure. In some embodiments, the method 400 is performed by an apparatus, such as a remote unit 101. In certain embodiments, the method 400 may be performed by a processor executing program code, for example, a microcontroller, a microprocessor, a CPU, a GPU, an auxiliary processing unit, a FPGA, or the like.

In step 401, the remote unit 101 receives at least one DL transmission within a DL association set from a base unit 102. In step 402, the remote unit 101 determines whether to use a fallback HARQ-ACK transmission or not. If the fallback HARQ-ACK transmission is used, the remote unit 101 transmits a fallback HARQ-ACK codebook on a fallback resource for the DL association set (step 404); if the fallback HARQ-ACK transmission is not used, the remote unit 101 transmits a semi-static HARQ-ACK codebook for the DL association set on a resource assigned for the semi-static HARQ-ACK codebook (step 403).

Moreover, the remote unit 101 may receive a radio resource control (RRC) signaling for enabling the fallback HARQ-ACK transmission. In one embodiment, a positive integer N may be configured in RRC signaling for determining whether to use the fallback operation or not. That is, if the remote unit 101 determines that the number of the received DL transmission is not larger than N (step 402), the remote unit 101 uses the fallback HARQ-ACK transmission (step 404). According to another embodiments, the positive integer N may be specified to a fixed value in standard. For example, N can be fixed to 1 in standard.

In one embodiment, in step 402, the processor of the remote unit 101 determine that the number of HARQ-ACK bits required for HARQ-ACK feedback corresponding to the DL association set; and if the number of HARQ-ACK bits is not larger than Z, the processor determines to use the fallback HARQ-ACK transmission, where Z is a positive integer, which can be configured by RRC signaling or be specified to a fix value in standard. In one embodiment, Z can be configured or fixed to 1 in standard for simplicity. In another embodiment, Z can be configured or fixed to 2 in standard. This is because NR PUCCH format 0 and format 1 can accommodate 1 or 2 bits. In a third embodiment, Z can be configured or fixed to M, where M is the RRC configured maximum number of CBGs per TB.

In another embodiment, an indicator is included in each DL transmission for performing step 402. According to a preferred embodiment, the indicator may be FI indicating whether the fallback HARQ-ACK transmission is to be used. If FI is set to "1," the remote unit 101 transmits a fallback HARQ-ACK codebook on a fallback resource for the DL association set (step 404). If FI is set to "0," the remote unit 101 transmits a semi-static HARQ-ACK codebook for the DL association set on a resource assigned for the semi-static HARQ-ACK codebook (step 403). Upon reception of the FI, remote unit 101 can know whether to use fallback HARQ-ACK transmission or not.

In another embodiment, the indicator for performing step 402 is a Single Transmission Indicator (STI) indicating whether a single DL transmission is transmitted in current downlink association set. The single DL transmission may be a single PDSCH or a single PDCCH for scheduling PDSCH or indicating DL SPS release. If STI is set to "1," the remote unit 101 transmits a fallback HARQ-ACK codebook on a fallback resource for the DL association set (step 404). If STI is set to "0," the remote unit 101 transmits a semi-static HARQ-ACK codebook for the DL association set on a resource assigned for the semi-static HARQ-ACK codebook (step 403) Upon reception of the STI, remote unit 101 can know whether to use the fallback HARQ-ACK transmission or not.

In another embodiment, the indicator for performing step 402 indicates whether the number of at least one DL transmission in the DL association set is not larger than X, a positive integer, which can be configured by RRC signaling or be specified to a fix value in standard. For example, X can be fixed to 1 in standard. If the indicator is set to "1," the fallback HARQ-ACK transmission is to be used; and if the indicator is set to "0," the semi-static HARQ-ACK codebook is to be used.

In another embodiment, the indicator for performing step 402 may be a one-bit DL assignment index (DAI). If the one-bit DAI is set to "1," the fallback HARQ-ACK transmission is to be used; and if the one-bit DAI is set to "0," the semi-static HARQ-ACK codebook is to be used.

In another embodiment, a total DAI for performing step 402 is introduced in each DL transmission, which is used to indicate the total number of DL transmissions in the DL association set. If the value of the total DAI in DL assignment is not larger than Y, a positive integer, which can be configured by RRC signaling or be specified to a fix value in standard, the fallback HARQ-ACK transmission is to be used; and if the value of the total DAI in DL assignment is larger than Y, the semi-static HARQ-ACK codebook is to be used. For example, Y can be fixed to 1 in standard. After determining the value of the total DAI in DL assignment, remote units 101 can know whether to use fallback HARQ-ACK transmission or not. According to embodiments of the present disclosure, the total DAI may include one bit, two bits or more bits.

In a preferred embodiment, the fallback HARQ-ACK codebook size may always be equal to 1 regardless of how many transport blocks (TBs) are carried in a single PDSCH or whether CBG-based retransmission is configured or not. In another preferred embodiment, the fallback HARQ-ACK codebook size may be equal to the number of HARQ-ACK bits for the single PDSCH in semi-static HARQ-ACK codebook. That is, the fallback HARQ-ACK codebook may include a single HARQ-ACK bit in response to a single DL transmission carrying a single TB; two HARQ-ACK bits in response to a single DL transmission carrying two TBs; M HARQ-ACK bits in response to a single DL transmission being transmitted and the single DL transmission is configured for code block group (CBG) based retransmission, wherein M is the configured maximum number of CBGs per TB. The fallback HARQ-ACK codebook may be carried in a physical uplink control channel (PUCCH) and the format of the PUCCH may be configured by RRC signaling.

Figure 5:
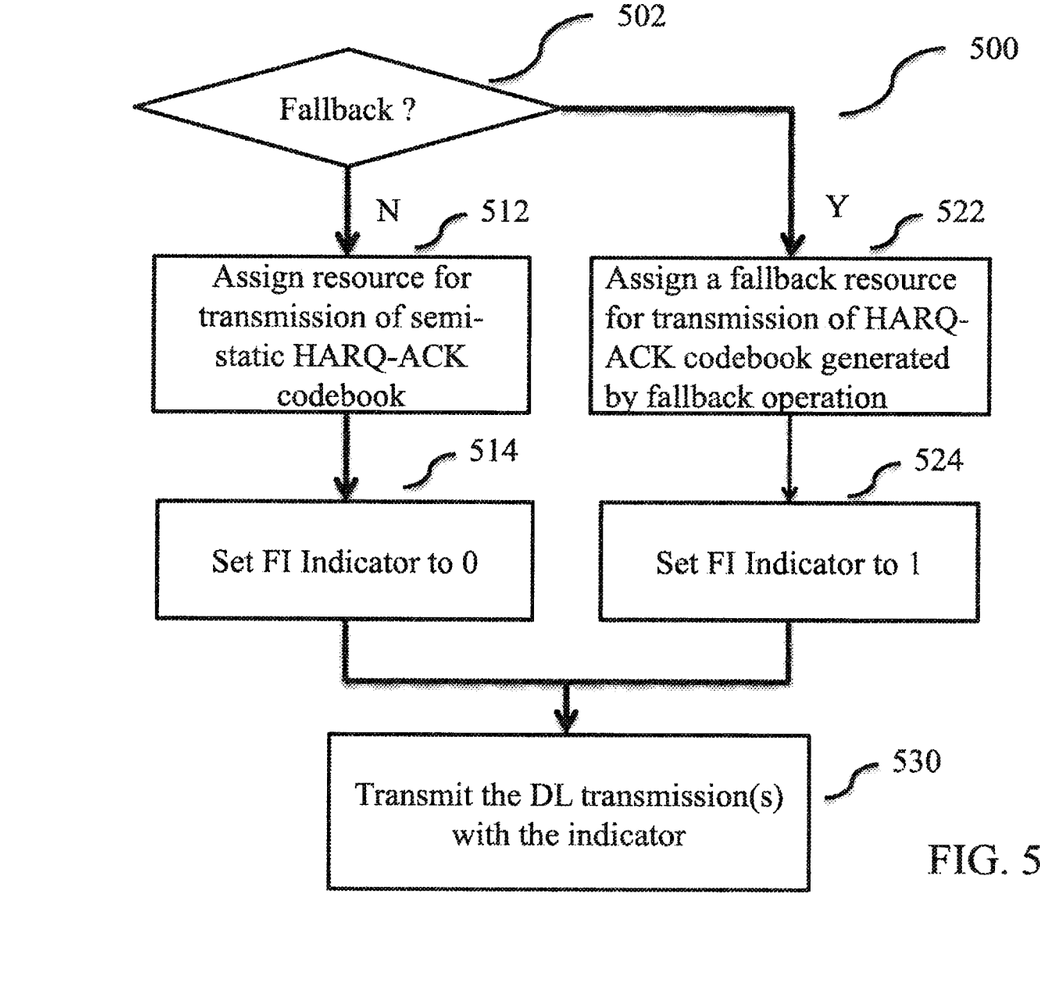
FIG. 5 illustrates a flowchart of a method according to an embodiment of the present disclosure.

FIG. 5 depicts a method 500 according to an embodiment of the present disclosure. In some embodiments, the method 500 is performed by an apparatus, such as a base unit 102. In certain embodiments, the method 500 may be performed by a processor executing program code, for example, a microcontroller, a microprocessor, a CPU, a GPU, an auxiliary processing unit, a FPGA, or the like.

In step 502, the base unit 102 determines whether a fallback HARQ-ACK transmission is to be used. If the fallback HARQ-ACK transmission is to be used, the base unit 102 assigns a fallback resource for transmission of the fallback HARQ-ACK codebook (step 522) and sets indicator to "1" (step 524); if the fallback HARQ-ACK transmission is not to be used, the base unit 102 assigns a resource for transmission of semi-static HARQ-ACK codebook (step 512) and sets the indicator to "0" (step 514). In preferred embodiments of the present disclosure, the indicator set in method 500 may be FI, STI, a one-bit DAI, total DAI and other indicator mentioned above. Afterward, the DL transmission(s) with an indicator is transmitted to the remote unit.

According to a preferred embodiment, the base units 101 further transmits a radio resource control (RRC) signaling for enabling the fallback HARQ-ACK transmission.

The fallback resource is assigned for transmission of the fallback HARQ-ACK codebook. In a preferred embodiment, a PUCCH resource indication in DL assignment is reused as fallback PUCCH resource indication. If the fallback HARQ-ACK transmission is requested, the base unit 102 assigns the fallback PUCCH resource and indicates it to the remote unit 101 in the field of PUCCH resource indication; otherwise, the base unit 102 assigns normal PUCCH resource in the field of PUCCH resource indication for transmission of semi-static HARQ-ACK codebook.

In another preferred embodiment, a fallback PUCCH resource is explicitly indicated in DL assignment. If the fallback HARQ-ACK transmission is indicated, the base unit 102 assigns fallback PUCCH resource and dynamically indicates it to the remote unit 101; otherwise, the bit field is reserved. According to an embodiment, the fall resource is indicated by an associated DL assignment from a set of resources configured by RRC signaling.

In another preferred embodiment, a fallback PUCCH resource is configured by RRC signaling. If the fallback HARQ-ACK transmission is indicated, the base unit 102 assigns fallback PUCCH resource for the remote unit 101; otherwise, the resource can be used for other purposes.

In yet another preferred embodiment, fallback PUCCH resource is linked to the resource with index equal to the lowest CCE index of PDCCH plus a certain offset. If the fallback HARQ-ACK transmission is requested, the base unit 102 assigns fallback PUCCH resource to the remote unit 101.

In some embodiments, the indicator in the DL transmission(s) is not required, and thus steps 514 and 524 for setting the indicator may be omitted. In one embodiment, the base unit 102 may determine whether a fallback HARQ-ACK transmission is to be used based on the number of the DL transmission(s) to be transmitted. The base unit 102 may determine a positive integer N and inform the remote unit 101 of N via RRC signaling. If the number of the DL transmission(s) to be transmitted is not larger than N, the base unit 102 determines that the fallback HARQ-ACK transmission will be used; otherwise, the fallback HARQ-ACK transmission will not be used. In one embodiment of the present disclosure, N may be a positive integer, which is specified to a fix value in standard.

In another embodiment, the base unit 102 may determine whether a fallback HARQ-ACK transmission is to be used based on the number of HARQ-ACK bits required for HARQ-ACK feedback corresponding to the DL transmission(s). The base unit 102 may determine a positive integer Z and inform the remote unit 101 of Z via RRC signaling. If the number of HARQ-ACK bits is not larger than Z, the base unit 102 determines that the fallback HARQ-ACK transmission would be used; otherwise, the fallback HARQ-ACK transmission would not be used. In one embodiment of the present disclosure, Z may be a positive integer N, which is specified to a fix value in standard.

Figure 6:
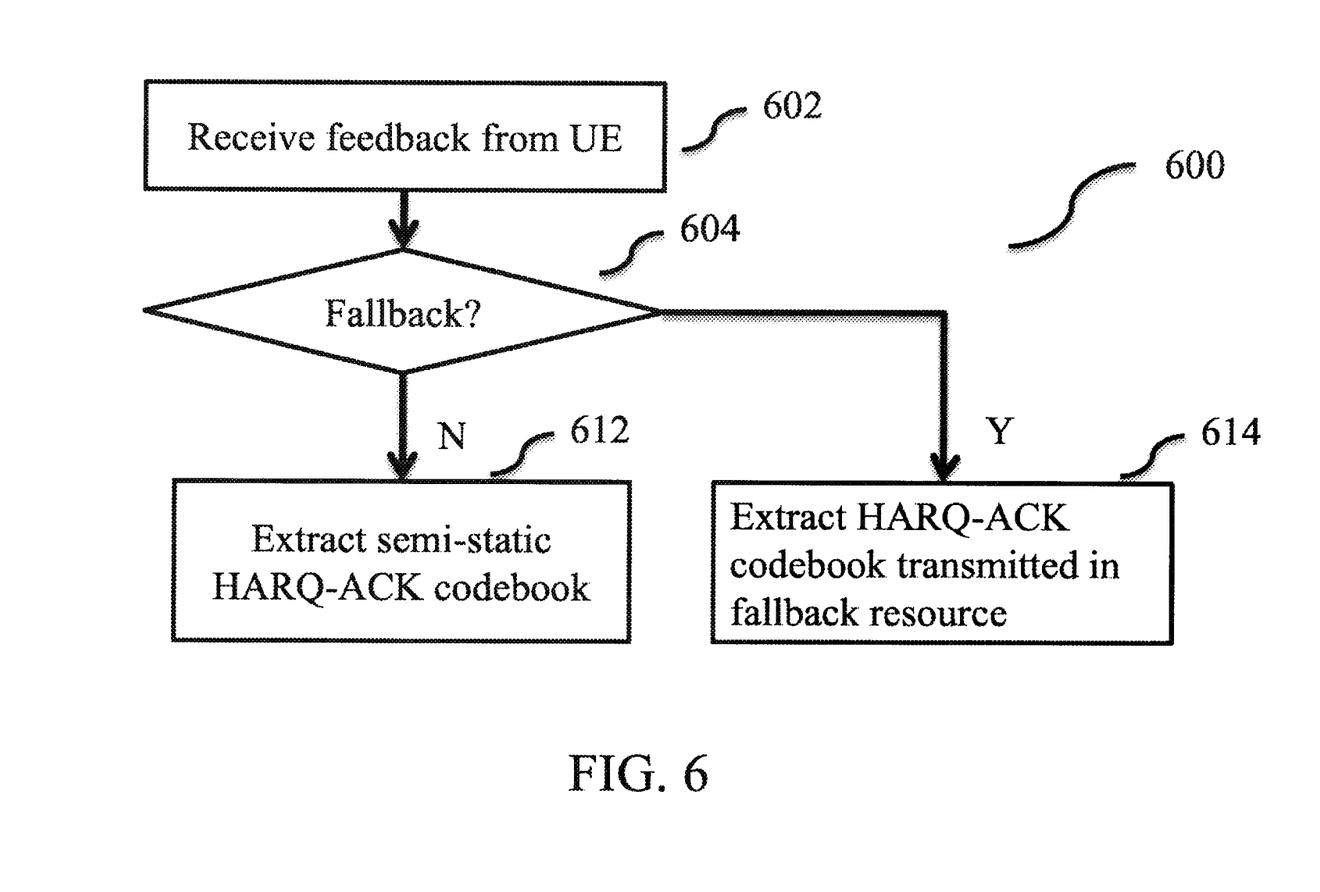
FIG. 6 illustrates a flowchart of a method according to an embodiment of the present disclosure.

FIG. 6 depicts a method 600 according to an embodiment of the present disclosure. The base unit 102 receives HARQ-ACK codebook from the remote units 101 (step 602). If the fallback HARQ-ACK transmission is used (step 604), the base units 102 extracts a fallback HARQ-ACK codebook for the number of DL transmissions on a fallback resource (step 614); if the fallback HARQ-ACK transmission is not used (step 604), the base units 102 extracts a semi-static HARQ-ACK codebook for the DL association set on a resource assigned for transmission of semi-static HARQ-ACK codebook (step 312).

Figure 7:
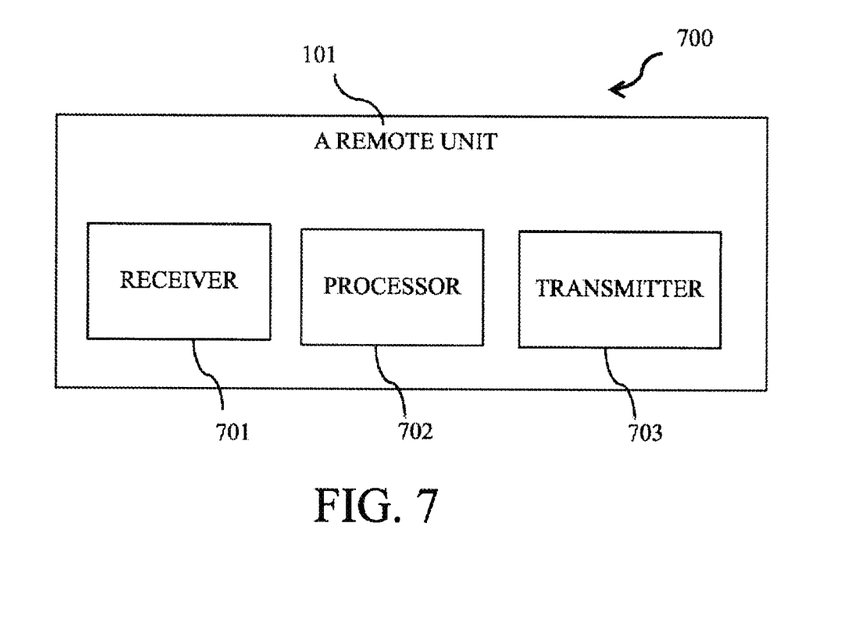
FIG. 7 illustrates an example block diagram of a remote unit according to an embodiment of the present disclosure.

FIG. 7 depicts an apparatus 700 according to the embodiments of the present disclosure. The apparatus 700 includes one embodiment of the remote unit 101. Furthermore, the remote unit 101 may include a receiver 701, a processor 702, and a transmitter 703. In some embodiments, the receiver 701 and the transmitter 703 are combined into a single device, such as a transceiver. In certain embodiments, the remote unit 101 may further include an input device, a display, a memory, and/or other elements. In one embodiment, the receiver 701 receives at least one downlink (DL) transmissions within a DL association set. The processor 702 determines whether to use a HARQ-ACK transmission. The transmitter 703 transmits a first HARQ-ACK codebook on a first resource for the DL association set in response to the fallback HARQ-ACK transmission being used or a second HARQ-ACK codebook on a second resource for the DL association set in response to the fallback HARQ-ACK transmission not being used. The functions and implementations of all elements in the apparatus 700 and definitions of related technical terms can refer to the specific descriptions of FIGS. 4-6 and the foregoing corresponding paragraphs in this specification.

Figure 8:
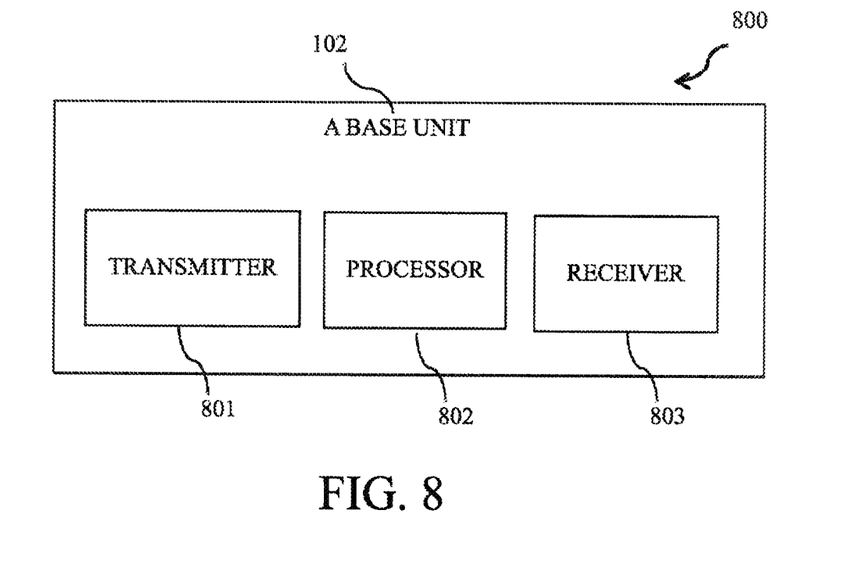
FIG. 8 illustrates an example block diagram of a base unit according to an embodiment of the present disclosure.

FIG. 8 depicts an apparatus 800 according to the embodiments of the present disclosure. The apparatus 800 includes one embodiment of the base unit 102. Furthermore, the base unit 102 may include a transmitter 801, a processor 802, and a receiver 803. In some embodiments, the transmitter 801 and the receiver 803 are combined into a single device, such as a transceiver. In certain embodiments, the base unit 102 may further include an input device, a display, a memory, and/or other elements. In one embodiment, a transmitter 801 transmits at least one downlink (DL) transmissions within a DL association set. The processor 802 determines whether a fallback HARQ-ACK transmission is used. The receiver 803 receives a first HARQ-ACK codebook on a first resource for the number of DL transmissions in response to the fallback HARQ-ACK transmission being used or a second HARQ-ACK codebook on a second resource for the DL association set in response to the fallback HARQ-ACK transmission not being used. The functions and implementations of all elements in the apparatus 800 and definitions of related technical terms can refer to the specific descriptions of FIGS. 3-6 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE), comprising:
   at least one memory; and
   at least one processor coupled with the at least one memory and configured to cause the UE to:
   receive a number of downlink (DL) transmissions, wherein at least one DL transmission of the number of DL transmissions comprises an indicator configured by a base station, the indicator indicating a quantity of the number of DL transmissions in a DL association set, the quantity of the number of DL transmissions is a number of slots carrying DL transmissions among a group of PCell slots and a group of SCell slots of the DL association set;
   determine, based at least in part on the indicator, a number of hybrid automatic repeat request acknowledgement (HARQ-ACK) bits for the number of DL transmissions in the DL association set;
   generate a fallback HARQ-ACK codebook comprising a single HARQ-ACK bit for the number of DL transmissions in the DL association set in response to determining, based at least in part on the indicator, that the quantity of the number of DL transmissions in the DL association set is equal to one and the number of HARQ-ACK bits for the number of DL transmissions in the DL association set is equal to one;
   generate a second HARQ-ACK codebook comprising HARQ-ACK bits for the number of DL transmissions in response to determining, based at least in part on the indicator, that the quantity of the number of DL transmissions of the DL association set is larger than one or the number of HARQ-ACK bits for the number of DL transmissions of the DL association set is larger than one, wherein the second HARQ-ACK codebook is a semi-static HARQ-ACK codebook; and
   transmit the fallback HARQ-ACK codebook on a first resource in response to generating the fallback HARQ-ACK codebook or transmits the second HARQ-ACK codebook on a second resource in response to generating the second HARQ-ACK codebook, wherein at least the first resource is assigned by the transmitting apparatus by at least one of: reusing a PUCCH resource indication in a DL assignment for the receiver, determining the lowest control channel element (CCE) index of a physical downlink control channel (PDCCH) associated with a DL transmission of the number of DL transmissions, or any combination thereof.

2. The UE of claim 1, wherein the at least one processor is configured to cause the UE to determine a size of the second HARQ-ACK codebook based at least in part on a quantity of the number of DL transmissions in the DL association set.

3. The UE of claim 1, wherein the indicator indicates whether a single DL transmission is transmitted in the number of DL transmissions in the DL association set.

4. The UE of claim 1, wherein the indicator indicates whether a quantity of the number of DL transmissions in the DL association set is not larger than a positive integer X.

5. The UE of claim 1, wherein the at least one DL transmission of the number of DL transmissions comprises a DL assignment index (DAI) indicating the quantity of the number of DL transmissions in the DL association set.

6. The UE of claim 1, wherein the fallback HARQ-ACK codebook includes M HARQ-ACK bits in response to a single DL transmission being transmitted in the number of DL transmissions in the DL association set and the single DL transmission is configured for code block group based retransmission, wherein M is a configured maximum number of code block groups per TB.

7. The UE of claim 1, wherein the first resource is indicated by an associated DL assignment from a set of resources configured by radio resource control signaling.

8. A processor for wireless communication, comprising:
at least one controller coupled with at least one memory and configured to cause the processor to:
receive a number of downlink (DL) transmissions, wherein at least one DL transmission of the number of DL transmissions comprises an indicator configured by a base station, the indicator indicating a quantity of the number of DL transmissions in a DL association set, the quantity of the number of DL transmissions is a number of slots carrying DL transmissions among a group of PCell slots and a group of SCell slots of the DL association set;
determine, based at least in part on the indicator, a number of hybrid automatic repeat request acknowledgement (HARQ-ACK) bits for the number of DL transmissions in the DL association set;
generate a fallback HARQ-ACK codebook comprising a single HARQ-ACK bit for the number of DL transmissions in the DL association set in response to determining, based at least in part on the indicator, that the quantity of the number of DL transmissions in the DL association set is equal to one and the number of HARQ-ACK bits for the number of DL transmissions in the DL association set is equal to one;
generate a second HARQ-ACK codebook comprising HARQ-ACK bits for the number of DL transmissions in response to determining, based at least in part on the indicator, that the quantity of the number of DL transmissions of the DL association set is larger than one or the number of HARQ-ACK bits for the number of DL transmissions of the DL association set is larger than one, wherein the second HARQ-ACK codebook is a semi-static HARQ-ACK codebook; and
in response to generating the fallback HARQ-ACK codebook, transmit the fallback HARQ-ACK codebook on a first resource, wherein at least the first resource is assigned by at least one of: reusing a PUCCH resource indication in a DL assignment, determining a lowest control channel element (CCE) index of a physical downlink control channel (PDCCH) associated with a DL transmission of the number of DL transmissions, or any combination thereof; and
in response to generating the second HARQ-ACK codebook, transmit the second HARQ-ACK codebook on a second resource.

9. The processor of claim 8, wherein the indicator indicates whether a single DL transmission is transmitted in the number of DL transmissions in the DL association set.

10. The processor of claim 8, wherein the indicator indicates whether the quantity of the number of DL transmissions in the DL association set is not larger than a positive integer X.

11. The processor of claim 8, wherein the at least one DL transmission of the number of DL transmissions comprises a DL assignment index (DAI) indicating the quantity of the number of DL transmissions in the DL association set.

12. A method performed by a user equipment (UE), the method comprising:
receiving a number of downlink (DL) transmissions, wherein at least one DL transmission of the number of DL transmissions comprises an indicator configured by a base station, the indicator indicating a quantity of the number of DL transmissions in a DL association set, the quantity of the number of DL transmissions is a number of slots carrying DL transmissions among a group of PCell slots and a group of SCell slots of the DL association set;
determining, based at least in part on the indicator, a number of hybrid automatic repeat request acknowledgement (HARQ-ACK) bits for the number of DL transmissions in the DL association set;
determining whether to generate a fallback HARQ-ACK codebook comprising a single HARQ-ACK bit for the number of DL transmissions in the DL association set in response to determining, based at least in part on the indicator, that the quantity of the number of DL transmissions in the DL association set is equal to one and the number of HARQ-ACK bits for the number of DL transmissions is equal to one or to generate a second HARQ-ACK codebook comprising HARQ-ACK bits for the number of DL transmissions in response to determining, based at least in part on the indicator, that the quantity of the number of DL transmissions in the DL association set is larger than one or the number of HARQ-ACK bits for the number of DL transmissions is larger than one, wherein the second HARQ-ACK codebook is a semi-static HARQ-ACK codebook;
in response to generating the fallback HARQ-ACK codebook, transmitting the fallback HARQ-ACK codebook on a first resource, wherein at least the first resource is assigned by at least one of: reusing a PUCCH resource indication in a DL assignment, determining a lowest control channel element (CCE) index of a physical downlink control channel (PDCCH) associated with a DL transmission of the number of DL transmissions, or any combination thereof; and
in response to generating the second HARQ-ACK codebook, transmitting the second HARQ-ACK codebook on a second resource.

13. A base station, comprising:
at least one memory; and
at least one processor coupled with the at least one memory and configured to cause the base station to:
configure an indicator indicating a quantity of DL transmissions in a number of DL transmissions in a DL association set, the quantity of the number of DL transmissions is a number of slots carrying DL transmissions among a group of PCell slots and a group of SCell slots of the DL association set;
transmit a number of downlink (DL) transmissions in the DL association set, wherein at least one DL transmission of the number of DL transmissions comprises the indicator;
determine whether a fallback hybrid automatic repeat request acknowledgement (HARQ-ACK) codebook comprising a single HARQ-ACK bit for the number of DL transmissions in the DL association set or a second HARQ-ACK codebook comprising HARQ-ACK information bits for the number of DL transmissions in the DL association set is generated by a receiving apparatus based on the quantity of the number of DL transmissions in the DL association set being equal to one or larger than one and/or the quantity of the number of DL transmissions in the DL association set being equal to one or larger than one, wherein the second HARQ-ACK codebook is a semi-static HARQ-ACK codebook;
in response to determining that the fallback HARQ-ACK codebook is generated:

assign a first resource for the receiving apparatus by at least one of:

reusing a PUCCH resource indication in a DL assignment for the receiving apparatus, determining a lowest control channel element (CCE) index of a physical downlink control channel (PDCCH) associated with a DL transmission of the number of DL transmissions, or any combination thereof; and receive the fallback HARQ-ACK codebook on the first resource; and in response to the second HARQ-ACK codebook being generated, receive the second HARQ-ACK codebook on a second resource.

14. The base station of claim 13, wherein the at least one processor is configured to cause the base station to determine a size of the second HARQ-ACK codebook based at least in part on the quantity of the number of DL transmissions in the DL association set.

15. The base station of claim 13, wherein a size of the fallback HARQ-ACK codebook corresponds to the quantity of the number of downlink transmissions in the DL association set.

16. The base station of claim 13, wherein the indicator indicates whether a single DL transmission is transmitted in the number of downlink transmissions in the DL association set.

17. The base station of claim 13, wherein the indicator indicates whether the quantity of the number of DL transmissions in the DL association set is not larger than a positive integer X.

18. The base station of claim 13, wherein the at least one DL transmission of the number of DL transmissions comprises a DL assignment index (DAI) indicating the quantity of the number of DL transmissions in the DL association set.

19. The base station of claim 13, wherein the fallback HARQ-ACK codebook includes M HARQ-ACK bits in response to a single DL transmission being transmitted in the number of DL transmissions in the DL association set and the single DL transmission is configured for code block group based retransmission, wherein M is the configured maximum number of code block groups per TB.

20. The base station of claim 13, wherein the at least one processor is configured to cause the base station to transmit, to the receiving apparatus, a DL assignment to indicate the first resource from a set of resources configured by radio resource control signaling.

\* \* \* \* \*